United States Patent
Peev et al.

(10) Patent No.: US 10,067,635 B2
(45) Date of Patent: Sep. 4, 2018

(54) THREE DIMENSIONAL CONDITIONAL FORMATTING

(71) Applicant: MICROSOFT TECHNOLOGY LICENSING, LLC, Redmond, WA (US)

(72) Inventors: Igor Peev, Arlington, WA (US); Brian Scott Ruble, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 76 days.

(21) Appl. No.: 15/158,609

(22) Filed: May 19, 2016

(65) Prior Publication Data
US 2016/0266766 A1 Sep. 15, 2016

Related U.S. Application Data

(63) Continuation of application No. 13/953,179, filed on Jul. 29, 2013, now Pat. No. 9,360,992.

(51) Int. Cl.
G06F 3/048 (2013.01)
G06F 3/0481 (2013.01)
(Continued)

(52) U.S. Cl.
CPC ........ G06F 3/04815 (2013.01); G06F 3/0482 (2013.01); G06F 3/0484 (2013.01);
(Continued)

(58) Field of Classification Search
CPC .. G06F 3/04815; G06F 3/0482; G06F 3/0484; G06F 3/04842; G06F 3/0488; G06F 3/04883; G06F 17/211; G06F 7/30994
(Continued)

(56) References Cited

U.S. PATENT DOCUMENTS

| 5,528,735 A | 6/1996 | Strasnick et al. |
| 5,848,425 A | 12/1998 | Lowry et al. |

(Continued)

FOREIGN PATENT DOCUMENTS

| CN | 102257489 A | 11/2011 |
| CN | 102930581 A | 2/2013 |

OTHER PUBLICATIONS

"Non-Final Office Action Issued in U.S. Appl. No. 13/953,179", dated Jul. 8, 2015, 9 Pages.
(Continued)

*Primary Examiner* — David Phantana-angkool
(74) *Attorney, Agent, or Firm* — Scott Y. Shitgeta; Newport IP, LLC

(57) ABSTRACT

Three dimensional, conditional formatting based data visualization is provided. Received underlying data may be analyzed and one or more portions of the underlying data that are of interest to a user determined. The portions may be selected actively by a user of automatically determined based on a variation of values in each portion, values of data points in each portion, a usage history of the user, and/or a credential of the user. A background image may be generated by converting the tabular data into a three dimensional image or selecting and image or a graphic associated with the underlying data. The visualization(s) may then be displayed over the background. Scenes may be selected for animated slide shows or movies.

19 Claims, 7 Drawing Sheets

(51) Int. Cl.
*G06F 3/0482* (2013.01)
*G06F 3/0484* (2013.01)
*G06F 3/0488* (2013.01)
*G06F 17/24* (2006.01)
*G06F 17/30* (2006.01)
*G06F 17/21* (2006.01)

(52) U.S. Cl.
CPC ........ *G06F 3/0488* (2013.01); *G06F 3/04842* (2013.01); *G06F 3/04883* (2013.01); *G06F 17/211* (2013.01); *G06F 17/246* (2013.01); *G06F 17/30994* (2013.01)

(58) Field of Classification Search
USPC ........................................................ 715/731
See application file for complete search history.

(56) References Cited

U.S. PATENT DOCUMENTS

| | | | |
|---|---|---|---|
| 6,222,540 B1 | 4/2001 | Sacerdoti | |
| 6,581,068 B1* | 6/2003 | Bensoussan | G06F 17/30457 |
| 6,747,650 B2 | 6/2004 | Turner et al. | |
| 7,737,979 B2 | 6/2010 | Robertson et al. | |
| 7,827,499 B2 | 11/2010 | Hao et al. | |
| 8,060,817 B2 | 11/2011 | Goldberg et al. | |
| 8,402,361 B2 | 3/2013 | Goldberg | |
| 8,423,445 B2 | 4/2013 | Rotenberg | |
| 8,660,869 B2 | 2/2014 | MacIntyre et al. | |
| 8,869,037 B2 | 10/2014 | Rose | |
| 8,984,415 B2 | 3/2015 | Rose et al. | |
| 9,058,307 B2 | 6/2015 | Tien et al. | |
| 9,852,205 B2* | 12/2017 | Tamayo | G06F 17/30592 |
| 9,857,958 B2* | 1/2018 | Ma | G06F 3/04847 |
| 2003/0071814 A1* | 4/2003 | Jou | G06F 9/542 |
| | | | 345/440 |
| 2006/0288284 A1 | 12/2006 | Peters et al. | |
| 2007/0250523 A1 | 10/2007 | Beers et al. | |
| 2008/0195928 A1 | 8/2008 | Matsa et al. | |
| 2010/0194778 A1 | 8/2010 | Robertson et al. | |
| 2013/0132811 A1 | 5/2013 | Ludwig | |
| 2015/0363050 A1* | 12/2015 | Kief | G06F 17/2241 |
| | | | 715/731 |
| 2017/0116294 A1* | 4/2017 | Ma | G06F 17/30554 |

OTHER PUBLICATIONS

"Notice of Allowance Issued in U.S. Appl. No. 13/953,179", dated Feb. 12, 2016, 6 Pages.

"International Preliminary Report on Patentability Issued in PCT Application No. PCT/US2014/047922", dated Nov. 19, 2015, 7 Pages.

"International Search Report and Written Opinion Issued in PCT Application No. PCT/US2014/047922", dated Dec. 4, 2014, 9 Pages.

"Second Written Opinion Issued in PCT Application No. PCT/US2014/047922", dated Jun. 29, 2015, 6 Pages.

"First Office Action and Search Report Issued in Chinese Patent Application No. 201480043173.X", dated May 2, 2018, 9 Pages.

* cited by examiner

THREE DIMENSIONAL CONDITIONAL FORMATTING

CROSS-REFERENCE TO RELATED APPLICATION

This application is a continuation under 35 U.S.C. § 120 of U.S. patent application Ser. No. 13/953,179 filed on Jul. 29, 2013. The disclosure of the U.S. Patent Application is hereby incorporated by reference in its entirety.

BACKGROUND

People interact with computer applications through user interfaces. While audio, tactile, and similar forms of user interfaces are available, visual user interfaces through a display device are the most common form of user interface. With the development of faster and smaller electronics for computing devices, smaller size devices such as handheld computers, smart phones, tablet devices, and comparable devices have become common. Such devices execute a wide variety of applications ranging from communication applications to complicated analysis tools. Many such applications render visual effects through a display and enable users to provide input associated with the applications' operations.

Data manipulation and presentation applications typically involve a number of manual actions such as a user defining resources of data, resources for updates, updating the data, and recreating visualizations. Conventional systems with manual and multi-step input do not satisfy user needs for efficient and rapid data analysis. Efficient data analysis is crucial to responding the proliferation of data analysis and manipulation in regular business and personal use. Frequent updates to data from variety of resources and manual operations sideline legacy systems as insufficient data provider. In addition, a user can seldom be expected to have sufficient expertise to construct efficient queries and connect visualizations with data updates. An average user cannot be expected to learn technical skills necessary to drive complex data analysis to match demand. Query platforms seldom simplify solutions to meet expansive and growing data analysis needs of modern users. As a result, a disconnect exists between users interacting with visualizations, associated data, and data resources to generate complex data analysis results.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to visualization of tabular data through three dimensional and conditional formatting. In addition to providing chart-based three dimensional visualizations, a system according to embodiments may enable underlying data based story-telling by enabling automatic visualization over data, animated presentation of visualizations, and even creation of scenes to walk through while visualizing underlying data.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
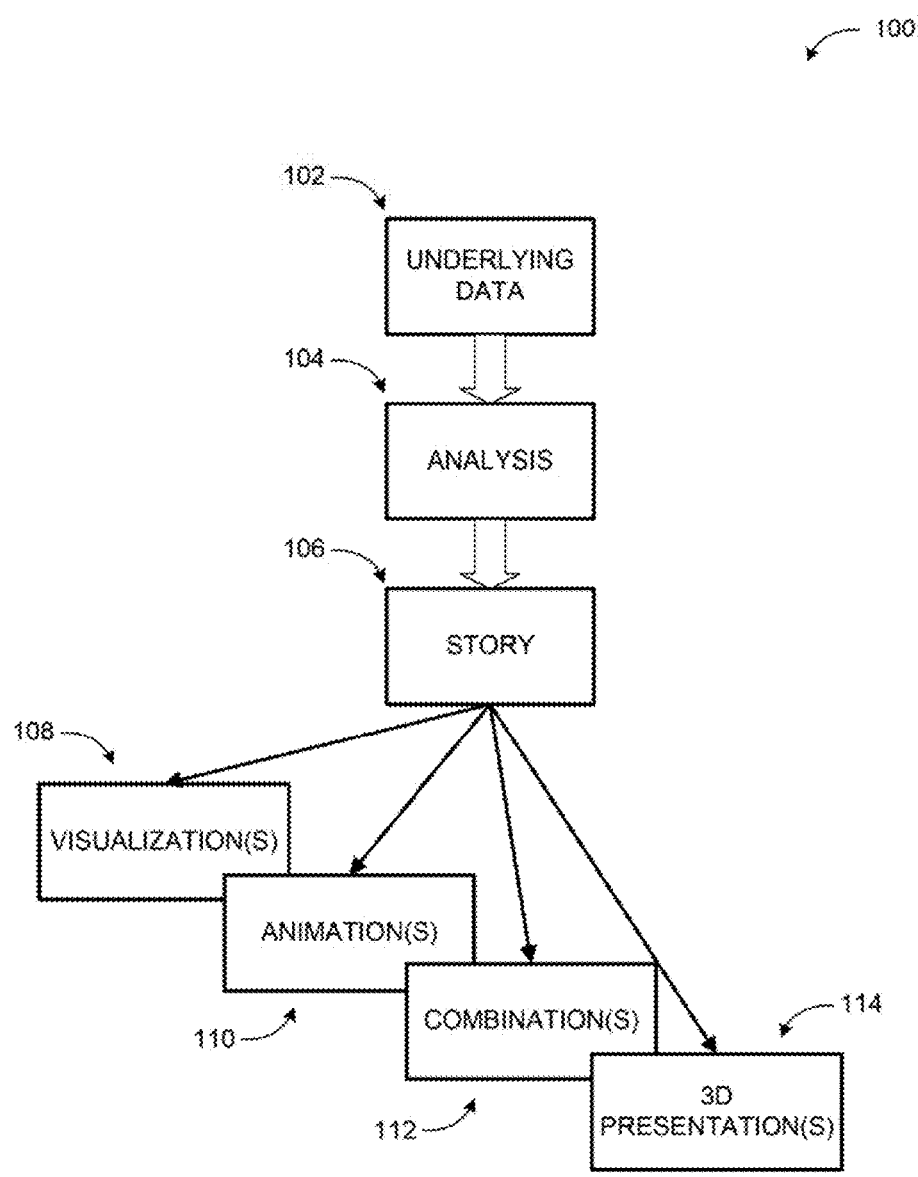
FIG. 1 is a conceptual diagram illustrating an example implementation flow of three dimensional, conditional formatting based data visualization according to some embodiments.

As briefly described above, data may be visualized through three dimensional, conditional formatting, animations, and automatic adjustments of visualization parameters enhancing user experience in interpreting tabular data.

In the following, detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices. Furthermore, embodiments may be implemented in computing devices capable of touch, gesture, eye-tracking, voice-command, gyroscopic, pen, and comparable interaction mechanisms in addition to keyboard and mouse inputs.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components for providing three dimensional, conditional formatting based data visualization. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 is a conceptual diagram illustrating an example implementation flow of three dimensional, conditional formatting based data visualization according to some embodiments.

The underlying data in some embodiments may be in tabular format or it may be in summary format (such as a pivot table), it may be filtered or not, it may be also sorted or unsorted. The three dimensional, conditional formatting may be performed for a quick analysis or a visual glimpse of what the current view of the data looks like. For example one may sort it by time, newest first and look for differences in values or cyclical patterns. Users may zoom in and zoom out from the surface on which the data is rendered. When such changes are performed, the data may change its representative scale. Moreover, the surface on which the data is rendered (i.e., the background) may be anything including images which are uploaded by the user or images/environments which are picked from a gallery, a map, a globe, a 3d rendering of a basketball court and so on. In other embodiments, formats may be bound to data and conditionally formatted. In other words, the formatting of the three dimensional visualization may be based on a different column of data. For example, the height of the bars in a three dimensional chart based visualization may represent the actual value in the cell (e.g. sales), whereas the color of the bars may represent a different column of data (e.g. profit).

A process of providing visualization through three dimensional conditional formatting may begin with underlying data 102. The underlying data 102 may be structured, unstructured, and formatted in various formats. Depending on the type of data, context of data processing, user preferences, and user permissions, the underlying data may be analyzed (104). Next, the analyzed data may be visualized, for example, in a story telling form 106. The story may be told using one or more visualizations 108, animations 110, three dimensional presentations 114, and combinations 112 thereof.

In one example embodiment, tabular data presented to a user in a two dimensional table may include different dimensions. For example, the columns may represent various products, sales figures, and comparable dimensions. The flat table view may not present the story of the data such as any trends, any significant data points that may need attention, variations, etc., at least not in a visual way that may draw the user's attention. A system according to embodiments may analyze the underlying tabular data determine which portion of the data is to be presented with visualization(s). Then, that portion may be displayed with chart based or other visualizations. For example, the tabular data presentation may be used as a background while the selected portion of the data (e.g., one or more dimensions) are presented as three dimensional graphics over that background enabling the user to see a comparison of data points in the selected portion in a visually more attention drawing manner. The user may be enabled to select various aspects of the story telling such as what type of visualizations, animations are to be used, which portion of data is to be visualized, what is to be used as background, presentation parameters (e.g., location, perspective, etc.) of the visualizations, and so on. The system may present each visualization/data combination as a scene to the user such that the user can at some point select various scenes and turn the visualizations into a slide presentation or an animated movie telling the story of the entire underlying data.

Embodiments may be implemented by locally installed data processing applications such as spreadsheet applications, database applications, presentation applications, note taking applications, or even word processing applications. Embodiments may also be implemented in hosted services accessed through thick or thin client applications such as browsers. Furthermore, various interaction mechanisms such as keyboard/mouse, touch, gesture, pen, eye-tracking, voice command, gyroscopic, and similar input mechanisms may be employed to interact with the system and select various parameters.

Figure 2:
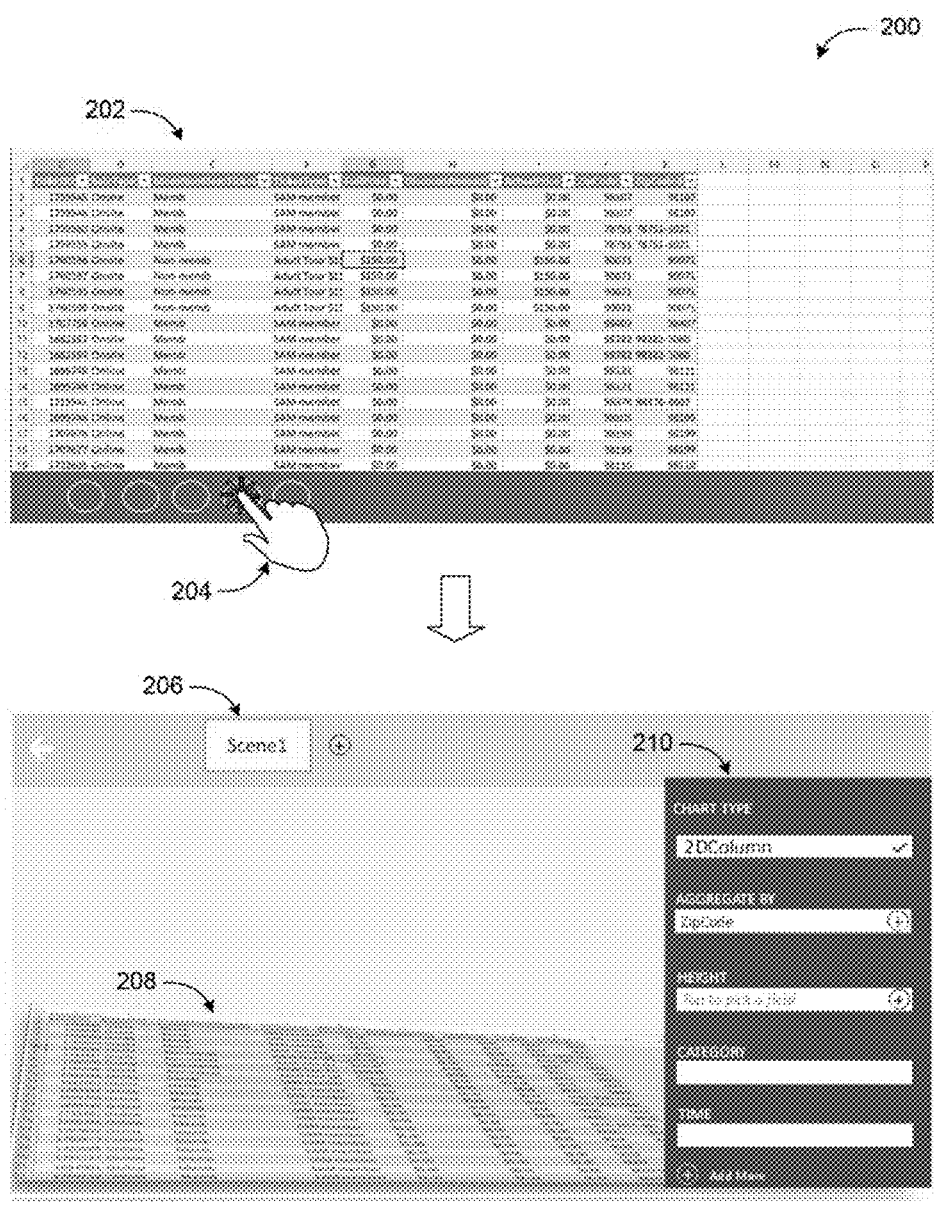
FIG. 2 illustrates conversion of tabular data to background for three dimensional, conditional formatting based data visualization.

FIG. 2 illustrates conversion of tabular data to background for three dimensional, conditional formatting based data visualization.

Diagram 200 first shows a user interface 202 of a data processing application such as a spreadsheet application presenting data in tabular format. While the presented data is inconsequential for the purposes of this illustration, it should be noted that the data includes dimensions. Visualization of the data based on three dimensional, conditional formatting may begin automatically upon detecting selection of a portion of the presented data or activation of a control element 204.

Next, the tabular presentation of the data may be converted into a three dimensional background 208 by tilting and twisting the tabular presentation. As mentioned above, a user may be enabled to create various visualization combinations and put together a slide presentation or a movie based on those combinations or scenes. Thus, this first visualization may be identified textually and/or graphically on the user interface as scene 1 206. In some embodiments, the user may be enabled to make the choices for the scene through a menu 210. The selections may include, but are not limited to a chart type (if the visualization is to be chart based), aggregation (one dimension of the visualization to be displayed), height (another dimension of the visualization to be displayed), a category of the scene, time, and comparable ones. The menu of selections may be presented in various ways (e.g., a dropdown menu a radial menu, a pop-up menu, etc.) on or outside the user interface. The selections may also be dynamically changeable depending on the underlying data, type of visualization, user preferences, and similar factors.

Figure 3:
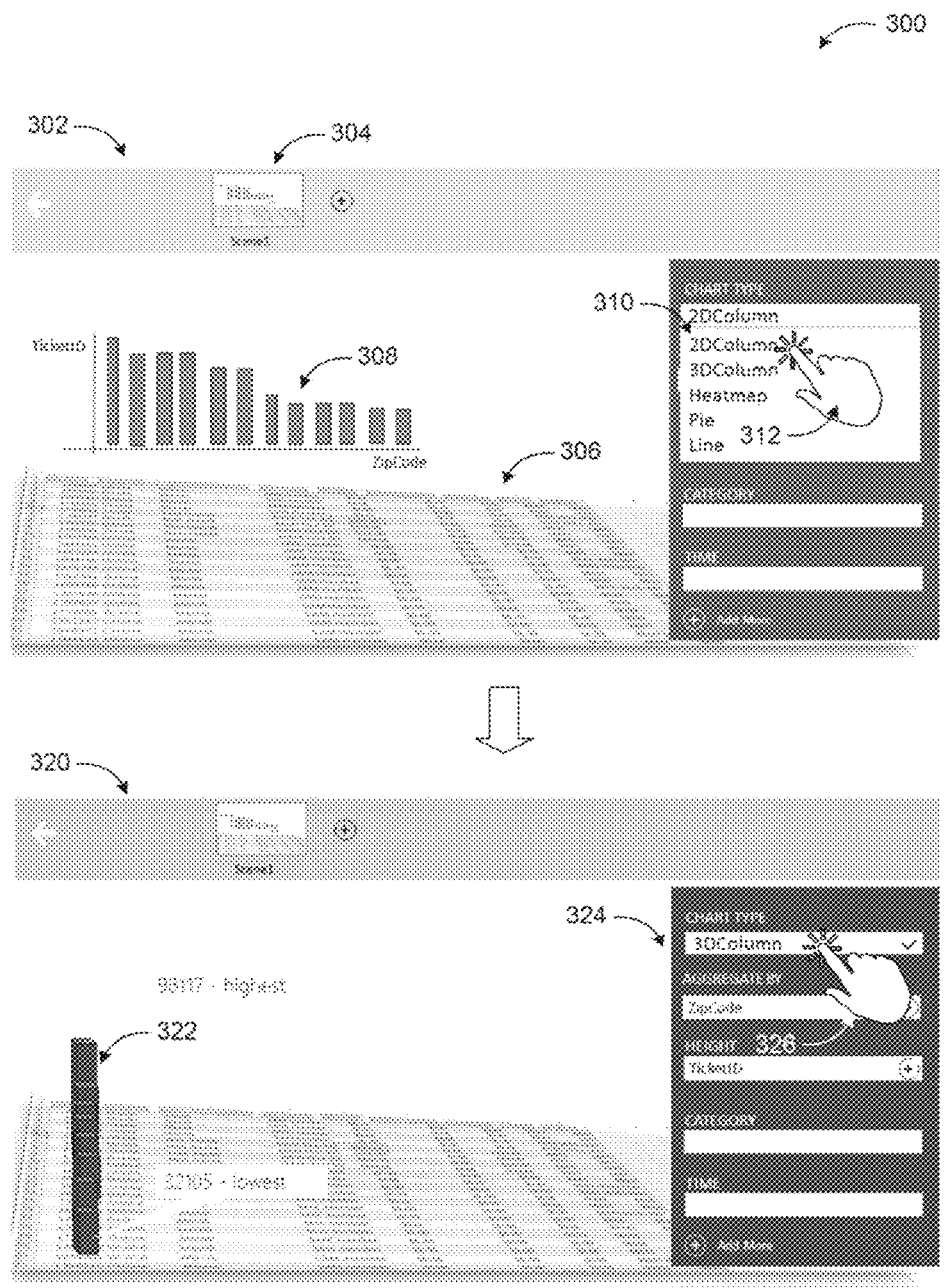
FIG. 3 illustrates presentation of chart based data visualization over the background shown in FIG. 2.

FIG. 3 illustrates presentation of chart based data visualization over the background shown in FIG. 2.

Diagram 300 shows two variations of data visualization that may follow each other or may be created independently. In user interface 302, the user may have selected (312) a two dimensional column visualization on the chart type menu 310. Following the selection, a two dimensional bar chart representation 308 of the selected portion of data may be displayed over the three-dimensionalized tabular data presentation as background 306.

The selected portion of the data that is represented by the two dimensional chart may be selected by the user or automatically selected by the system based on the analysis results (e.g., product column with highest sales figures, product column of most interest to the user based on their usage history or credentials, etc.). The graphic representation of the scene, icon 304, may also be updated to reflect the change to the scene composition.

Subsequently or independently from the first set of selections, the user may select (326) a three dimensional bar chart visualization 324 and the selected portion of the data may be displayed as a three dimensional bar chart 322 over the background. To illustrate variations in placement, the bar chart 322 is placed (automatically or based on user selection) over the portion of the background containing the underlying selected portion of the data and aligned with that column providing further visual correlation. Other parameters such as colors, bar sizes, borders, etc,, may be predefined, user selectable, and/or automatically configurable based on the composition of the scene. According to some embodiments, these and other formats may be bound to data and conditionally formatted. For example, the color of the bars may he tied to profitability, which could come from a different table of data.

Figure 4:
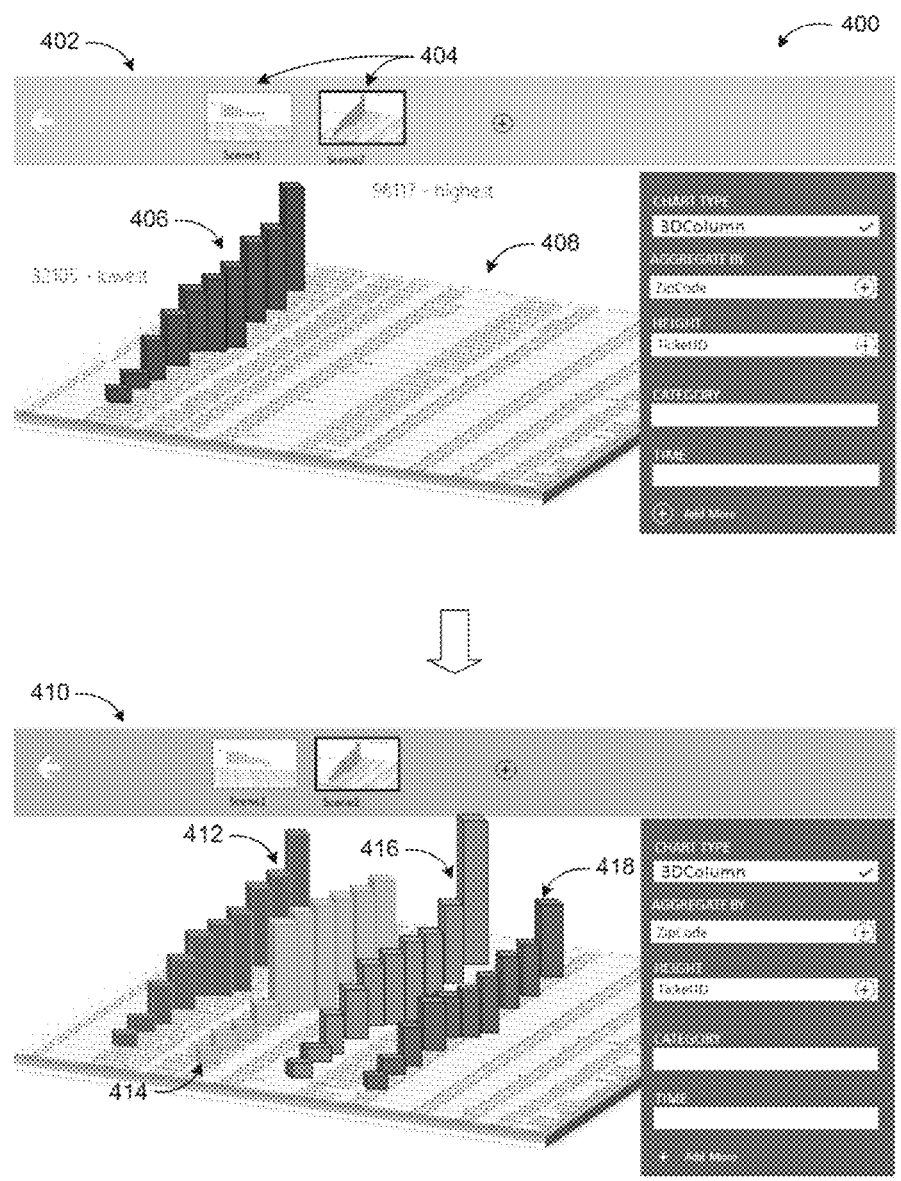
FIG. 4 illustrates variations of the chart based three dimensional, conditional data visualization of FIG. 3 according to some embodiments.

FIG. 4 illustrates variations of the chart based three dimensional, conditional data visualization of FIG. 3 according to some embodiments.

Diagram 400 shows further variations of scene composition in a system according to embodiments. In user interface 402, the user may have modified placement and/or perspective of the background 408 and the bar chart based visualization 406 of the selected portion of data through selection of displayed commands or through touch/gesture input on the visualization elements. Alternatively, the system may automatically adjust placement and perspective parameters for enhanced presentation of the overall scene. Upon user approval, the presented configuration may be saved as scene 2. The approved scenes 404 may be subsequently selected by the user for a slide presentation or a movie presentation adding animations.

Multiple visualizations may also be used according to some embodiments. User interface 410 illustrates an example, where three dimensional bar chart based visualizations 412, 414, 416, and 418 are presented in alignment with their respective underlying data on the tabular data background allowing the user to compare the trends and variations in data visually. Visualizations are not limited to bar charts or any charts. Other visualizations such as free form representations may also be employed. In addition to using the underlying data as background, other backgrounds such as images or graphics associated with the underlying data (e.g., a picture of a bicycle for data representing bicycle sales, construction plans of as building under construction, a map of a geographic region associated with the underlying data, etc.) may also he selected automatically or by the user as backgrounds.

The example scenarios and schemas in FIG. 1 through 4 are shown with specific components, charts, visualizations, and configurations. Embodiments are not limited to systems according to these examples. Three dimensional, conditional formatting based data visualization may be implemented in configurations employing fewer or additional components in applications and user interfaces using the principles described herein.

Figure 5:
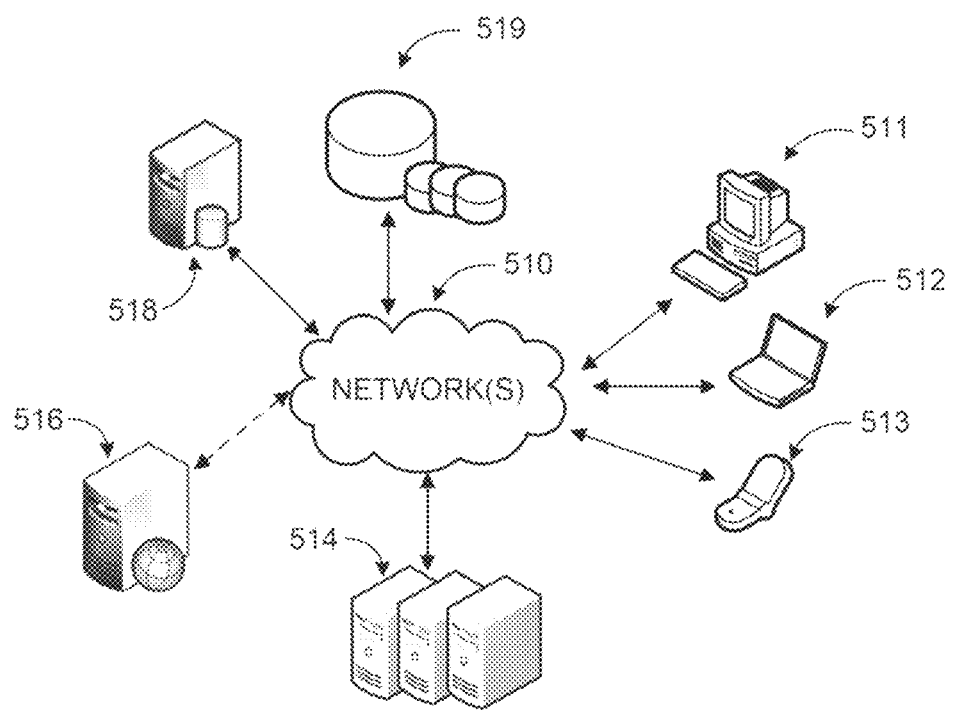
FIG. 5 is a simplified networked environment, where a system according to embodiments may be implemented.

FIG. 5 is an example networked environment, where embodiments may be implemented. A three dimensional, conditional formatting based data visualization system may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516 in providing users data visualizations, analyses, reports, and so on. A visualization engine may perform the actions discussed herein. Updates or additional data associated with visualization may be stored in data store(s) 519 directly or through database server 518 associated with the hosted service.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide three dimensional, conditional formatting based data visualization. Furthermore, the networked environments discussed in FIG. 5 are for illustration purposes only. Embodiments are not limited to the example applications, modules, or processes.

Figure 6:
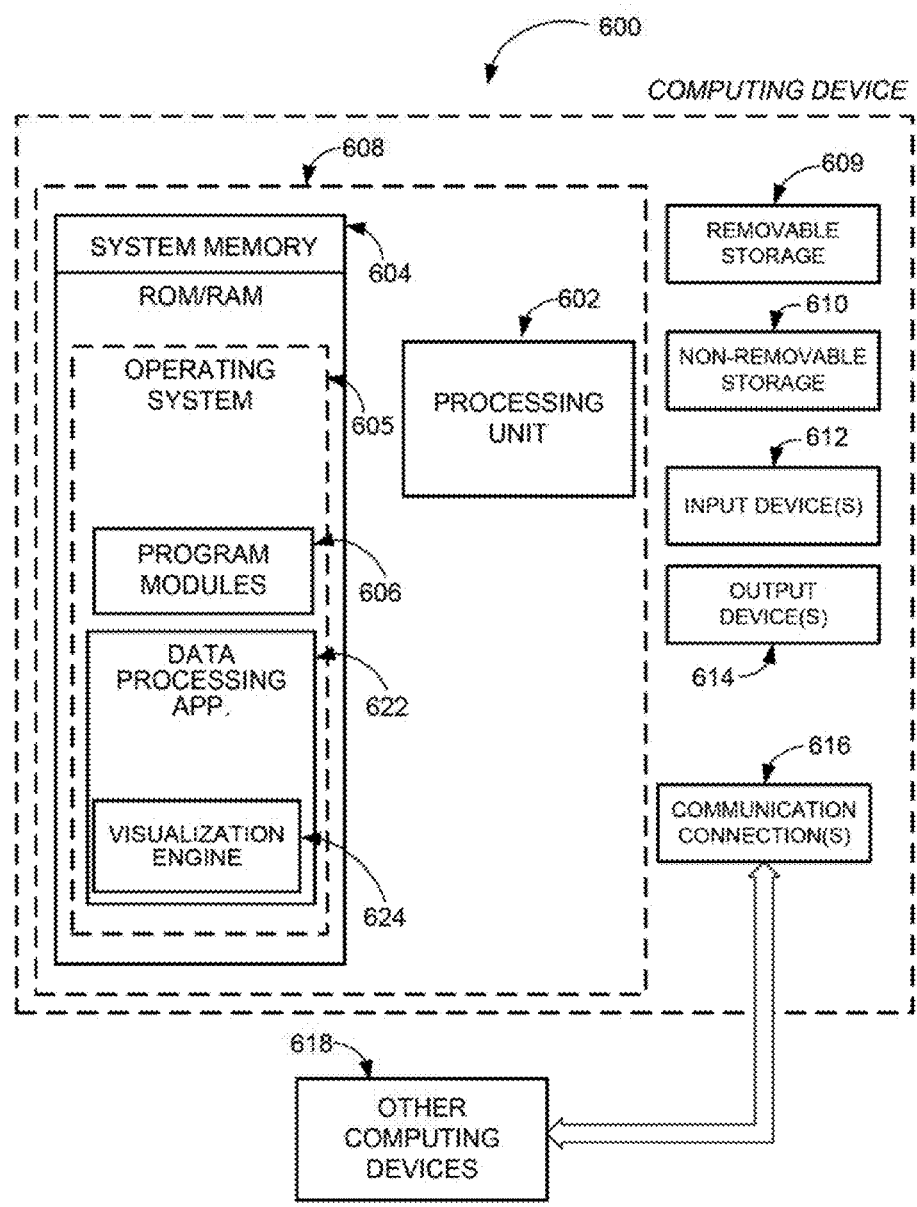
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing a data visualization application according to embodiments and include at least one processing unit 602 and system memory 604. Computing device 600 may also include a plurality of processing, units that cooperate in executing programs. Depending on the exact configuration and type of computing device, the system memory 604 may be volatile (such as RAM), non-volatile (such as ROM, flash memory. etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, data processing application 622, and visualization engine 624.

Data processing application 622 may perform a variety of tasks on underlying data such as analyzing, presenting, enabling modification, update etc. The data processing application 622 may operate in conjunction with the visualization engine 624 to provide three dimensional, conditional formatting based data visualization as discussed above. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing deice 600 may also have input device(s) 612 such as keyboard, mouse, pen, voice input device, touch input device, an optical capture device for detecting gestures, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
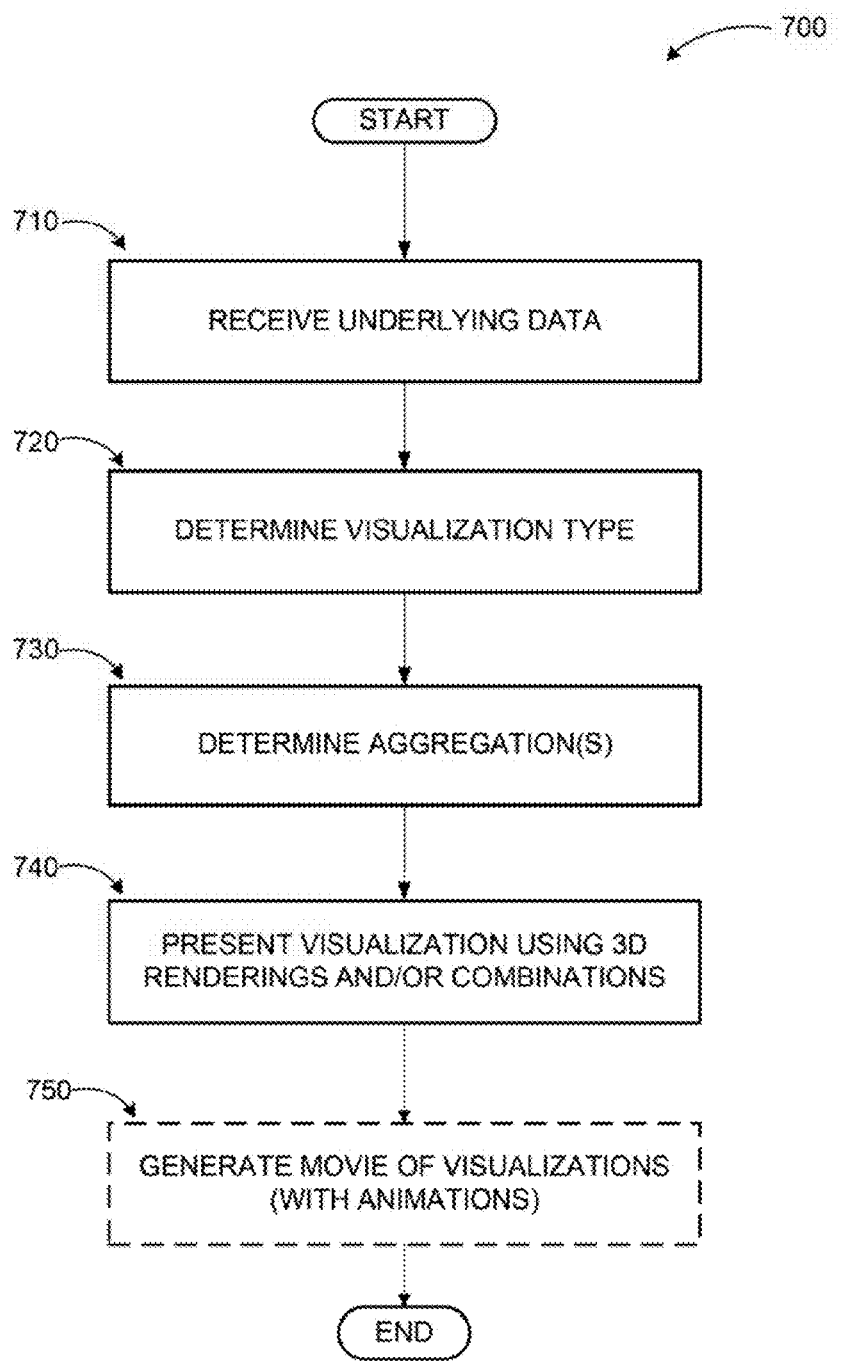
FIG. 7 illustrates a logic flow diagram for a process of providing three dimensional, conditional formatting based data visualization according to embodiments.

FIG. 7 illustrates a logic flow diagram for a process for providing three dimensional, conditional formatting based data visualization according to embodiments. Process 700 may be implemented in conjunction with a visualization module within a data processing service or application.

Process 700 begins with operation 710, where underlying data may be received at the data processing application. The underlying data may be formatted in a number of different ways. For example, the underlying data may be tabular data provided to a spreadsheet application and viewed as a table by the user. At operation 720, a visualization type may be determined based on user selection or other factors such as user preferences or credentials, an organizational default, data type, and similar parameters.

At operation 730, aggregation(s) may be determined for the visualization. For example, in a chart based visualization, the aggregations may identify which dimension of tabular data is to be presented by the visualization. The visualization may then be presented at operation 740 using three dimensional renderings in combination with other aspects such as a background based on the original data (e.g., the table), multiple visualizations, etc. Placement, perspective, size, coloring, shading, and other characteristics of the visualization may be determined automatically and/or based on user selection.

At optional operation 750, a movie may be generated based on the visualizations through animation, for example. Other enhancements of data visualization may include a walk-through on a scene with visualizations being played in context.

The operations included in process 700 are for illustration purposes. Three dimensional, conditional formatting based data visualization may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it s to he understood that the subject matter defined in the appended claims is not necessarily limited to the specific features or acts described above. Rather, the specific features and acts described above are disclosed as example forms of implementing the claims and embodiments.

What is claimed is:

1. A server configured to provide three dimensional, conditional formatting based data visualization, the server comprising:
   a memory configured to store instructions;
   a communication module configured to exchange data with one or more computing devices; and
   a processor coupled to the memory and the communication module, the processor adapted to execute a data processing application M conjunction with instructions stored in the memory wherein the processor is configured to:
   receive underlying data;
   analyze the underlying data;
   determine a portion of the underlying data to be visualized;
   determine a background for a visualization through one of conversion of a tabular presentation of the underlying data to a three dimensional background image, selection of an image associated with the underlying data, and selection of a graphic associated with the underlying data;

provide the visualization of the portion of the underlying data over the determined background to the one or more computing devices to be displayed; and adjust one or more placement and perspective parameters of the visualization and the background image for enhanced presentation of an overall scene on the one or more computing devices through one of a touch/gesture input, a selection of commands, an automatic selection received from the one or more computing devices.

2. The server of claim 1, wherein the processor is further configured to:

provide a miniaturized graphic representation of a scene comprising the background and the visualization to the one or more computing devices to be displayed; and complement the miniaturized graphic representation of the scene with textual information.

3. The server of claim 1, wherein the processor is further configured to:

conditionally format the visualization based on an aspect of the portion of the underlying data that is different from another aspect represented by the visualization.

4. The server of claim 1, wherein the processor is further configured to:

provide a history of visualizations of the portion of the underlying data over the determined background through a plurality of miniaturized graphic representations presented in a vicinity of the presented visualization to the one or more computing devices to be displayed.

5. The server of claim 1, wherein the processor is further configured to:

save a plurality of scene sequences along with animation parameters as multiple slide presentations or movies visualizing the underlying data; and provide the plurality of scene sequences to the one or more computing devices to be displayed.

6. The server of claim 1, wherein the processor is further configured to:

provide a menu of actions associated with the background image and the visualization to the one or more computing devices to be displayed, wherein the menu includes one or more of a chart type for the visualization, an aggregation dimension for the visualization, a height dimension for the visualization, and a category of the scene; and provide another menu for selection of one or more scenes for one of a slide show and a movie to the one or more computing devices to be displayed, wherein the other menu includes selections for animation and transition parameters for the slide show and the movie.

7. The server of claim 1, wherein the data processing application includes a visualization engine configured to generate the visualization.

8. A method executed on a computing device for three dimensional, conditional formatting based data visualization, the method comprising:

receiving underlying data;

analyzing the underlying data;

determining a portion of the underlying data that is of interest to a user based on one or more of a variation of values in each portion, values of data points in each portion, a usage history of the user, and a credential of the user;

determining a background for a visualization of the portion of the underlying data, wherein the background is based on an image associated with the underlying data;

providing the visualization of the portion of the underlying data over the determined background to be displayed; and adjusting one or more placement and perspective parameters of the visualization and the background for enhanced presentation of an overall scene through one of a touch/gesture input, a selection of commands, an automatic selection.

9. The method of claim 8, further comprising:

providing a control element to he displayed for creation of one of a slide show and a movie scene based on the underlying data.

10. The method of claim 8, further comprising:

placing the visualization over a corresponding portion of underlying data in the background; and aligning the visualization with the corresponding portion of underlying data.

11. The method of claim 10, further comprising:

providing a history of visualizations of the portion of the underlying data over the determined background through a plurality of miniaturized graphic representations presented in a vicinity of the presented visualization to be displayed.

12. The method of claim 8, further comprising:

upon user confirmation, saving the background and the visualization as a scene; and providing miniaturized graphic representations of a plurality of scenes corresponding to a plurality of backgrounds and a plurality of visualizations to be displayed.

13. The method of claim 8, wherein one or both of the background and the visualization are three-dimensionally presented.

14. The method of claim 8, wherein the visualization is one of a bar chart, a pie chart, a scatter chart, and a line graph.

15. A system configured to provide three dimensional, conditional formatting based data visualization, the system comprising:

a first server configured to manage data associated with a hosted service; and a second server configured to provide the hosted service, the hosted service including one or more of a spreadsheet application, a database application, a presentation application, a note taking application, and a word processing application, wherein the second server is configured to execute a visualization engine, the visualization engine configured to:

receive underlying data from the second server;

analyze the underlying data;

determine a portion of the underlying data to be visualized that is of interest to a user based on one or more of a variation of values in each portion, values of data points in each portion, a usage history of the user, and a credential of the user;

determine a background image associated with the underlying data;

provide the visualization of the portion of the underlying data over the determined background image to one or more computing devices to be displayed, wherein the visualization is conditionally formatted such that the visualization and one or more format characteristics of the visualization represent different aspects of the portion of the underlying data; and adjust one or more placement and perspective parameters of the visualization and the background image for enhanced presentation of an overall scene on the one or more computing devices through one of a touch/gesture input, a selection of commands, an automatic selection received from the one or more computing devices.

16. The system of claim 15, wherein the visualization engine is configured to determine the background image by converting a tabular presentation of the underlying data to a three dimensional background image.

17. The system of claim 15, wherein the visualization engine is further configured to:
generate a plurality of scenes based on a plurality of combinations of background images and visualizations corresponding to a plurality of portions of the underlying data; and
enable selection of one or more scenes for the slide show or the movie.

18. The system of claim 17, wherein the visualization engine is further configured to
enable selections for animation and transition parameters for the slide show or the movie.

19. The system of claim 15, wherein the visualization is associated with the spreadsheet application.

* * * * *